US006561545B2

(12) United States Patent
Greib et al.

(10) Patent No.: US 6,561,545 B2
(45) Date of Patent: May 13, 2003

(54) VARIABLE PROFILE AIR BAG RESTRAINT

(75) Inventors: Gary R Greib, Lake Orion, MI (US); Michael John Wolanin, Hartland, MI (US); Scott David Thomas, Novi, MI (US)

(73) Assignees: Delphi Technologies, Inc., Troy, MI (US); General Motors Corporation, Detroit, MI (US)

( * ) Notice: Subject to any disclaimer, the term of this patent is extended or adjusted under 35 U.S.C. 154(b) by 0 days.

(21) Appl. No.: 10/095,141

(22) Filed: Mar. 11, 2002

(65) Prior Publication Data

US 2002/0125706 A1 Sep. 12, 2002

Related U.S. Application Data

(62) Division of application No. 09/672,409, filed on Sep. 28, 2000, now Pat. No. 6,390,501.
(60) Provisional application No. 60/165,330, filed on Nov. 12, 1999, and provisional application No. 60/222,560, filed on Aug. 3, 2000.

(51) Int. Cl.[7] ............................................. B60R 21/32
(52) U.S. Cl. ..................................... 280/743.2; 280/735
(58) Field of Search ........................... 280/743.1, 743.2, 280/739, 740, 732, 735, 736, 742

(56) References Cited

U.S. PATENT DOCUMENTS

| 5,308,113 | A | * | 5/1994 | Moriset ................... 280/743.2 |
| 5,489,119 | A | * | 2/1996 | Prescaro et al. ......... 280/743.2 |
| 5,762,367 | A | * | 6/1998 | Wolanin .................. 280/736 |
| 5,887,894 | A | * | 3/1999 | Castagner et al. ....... 280/743.2 |
| 6,039,346 | A | * | 3/2000 | Ryan et al. .............. 280/736 |
| 6,076,854 | A | * | 6/2000 | Schenck et al. ......... 280/743.2 |
| 6,123,358 | A | * | 9/2000 | Ryan et al. .............. 280/739 |
| 6,237,949 | B1 | * | 5/2001 | Nozumi et al. .......... 280/735 |
| 6,290,257 | B1 | * | 9/2001 | Bunce et al. ............ 280/739 |
| 6,315,323 | B1 | * | 11/2001 | Pack, Jr. ................. 280/743.2 |
| 6,334,627 | B1 | * | 1/2002 | Heym et al. ............. 280/743.2 |
| 6,390,501 | B1 | * | 5/2002 | Greib et al. ............. 280/743.2 |
| 6,422,597 | B1 | * | 7/2002 | Pinsenschaum et al. .... 280/735 |
| 6,425,603 | B1 | | 8/2002 | Eschbach ................ 280/743.2 |
| 6,454,300 | B1 | | 9/2002 | Dunkle et al. ............ 280/742 |
| 2001/0035637 | A1 | | 11/2001 | Thomas et al. ........... 280/736 |

FOREIGN PATENT DOCUMENTS

| DE | 19756977 A1 | * | 7/1999 | ........... B60R/21/16 |
| DE | 19813832 A1 | * | 9/1999 | ........... B60R/21/02 |
| DE | 19926486 A1 | * | 1/2000 | ........... B60R/21/02 |
| GB | 2299550 | | 10/1996 | |

* cited by examiner

*Primary Examiner*—Paul N. Dickson
*Assistant Examiner*—David R. Dunn
(74) *Attorney, Agent, or Firm*—Kathryn A. Marra (57) ABSTRACT

An air bag assembly for cushioning restraint of an occupant in a vehicle during an impact event. The air bag assembly includes an inflator activatable to discharge inflation gas upon the occurrence of predetermined vehicle conditions and an air bag cushion in fluid communication with the inflator such that upon discharge of inflation gas from the inflator the air bag cushion is inflated to a deployed state from a location of deployment in substantially opposing relation to the occupant. One or more profile restraining tether elements extend from locations on the air bag cushion to a releasable anchor structure so as to shorten the operative length of the profile restraining tether elements. An actuation mechanism activatable in response to a signal from a sensor measuring occupant conditions is used to release the tether elements from the releasable anchor thereby extending the operative profile of the air bag cushion upon the occurrence of predetermined occupant conditions.

10 Claims, 8 Drawing Sheets

VARIABLE PROFILE AIR BAG RESTRAINT

This is a division of application Ser. No. 09/672,409 having a filing date of Sep. 28, 2000 is now U.S. Pat. No. 6,390,501 benefit of previously filed United States provisional applications 60/165,330 filed Nov. 12, 1999 and 60/222,560 filed Aug. 3, 2000.

TECHNICAL FIELD

This invention relates to an air bag restraint system, and more particularly to an air bag restraint system which controls the expansion characteristics of an inflatable air bag cushion discharged therefrom such that the inflated profile of the discharged air bag may be varied based upon the size and/or position of the vehicle occupant to be protected and/or upon the severity of a crash event.

BACKGROUND OF THE INVENTION

It is well known in the prior art to provide an air bag assembly including an inflatable air bag for protecting the occupants of a transportation vehicle. In an automotive vehicle such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side-impact event. It is also known to utilize inflatable curtain-like structures for deployment from the structural pillars or roof line of the motor vehicle so as to promote restraint and protection of the vehicle occupant during a roll-over event.

Air bag assemblies typically include an inflatable cushion in fluid communication with a gas emitting inflator. Upon sensing certain predetermined vehicle conditions, such as a certain amount of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. The pressure within the air bag cushion upon deployment is proportional to the quantity of inflator gas expelled into the air bag and inversely proportional to the volume occupied by the inflator gas within the air bag. As the occupant comes into contact with the expanded air bag, the inflator gas is forced out of the air bag thereby dissipating the kinetic energy of the occupant.

In some cases, it may be desirable to provide an inflator that has varied levels or stages of inflator gas output in response to the sensing of different vehicle or occupant conditions. Thus, it is generally known in the prior art to provide multi-stage inflators that discharge inflation gas at variable levels depending upon the conditions present during deployment. However, these multi-stage inflators are more complex than typical inflators. Moreover, the use of such multi-stage inflators provides control over only the amount of inflator gas which is discharged and does not provide control over the expanded geometry of the inflated air bag cushion. That is, so long as the air bag has a fixed expanded geometry, the inflator gas will tend to fill the available capacity and the expanded configuration of the air bag will be generally the same even if the quantity of inflator gas is varied although the pressure within the air bag will tend to differ appreciably.

In order to provide an additional degree of freedom in the control of air bag performance, it has been suggested to utilize air bag cushions which incorporate seams within the air bag to control the expanded geometry of the inflated air bag wherein the seams separate upon the introduction of sufficient force across the seams thereby freeing the air bag cushion from the restraint imposed by the seams at lower pressures. In order for such break-away seams to provide controlled expansion, the application of such seams must be performed with substantial precision such that seam separation will occur in a highly reproducible and predictable manner. As will be appreciated, due to the large number of variables involved in the introduction and separation of such break-away seams, such requisite precision and reproducibility may be difficult to achieve.

SUMMARY OF THE INVENTION

The present invention provides advantages and alternatives over the prior art by providing an assembly to vary the deployed profile of an air bag cushion which may be inflated to a controlled variable level using either a single stage or multi-stage inflator and which may be expanded preferentially in the depth direction towards the occupant to be protected without the need to rely exclusively on break-away seams. The present invention thereby provides an air bag cushion which may be deployed to a relatively shallow profile during a crash event of low severity or for the protection of a small stature occupant or an occupant seated in close proximity to the air bag and which may also be deployed to a profile of substantially increased depth during a severe crash event or for protection of a larger occupant or an occupant seated further away from the location of air bag deployment. The present invention further provides a mechanism for simply and effectively controlling both the profile of the deployed air bag cushion and the quantity of inflation gas released into the air bag cushion.

Advantageously, according to one aspect this invention provides an assembly to deploy an air bag cushion to a controlled geometry of a depth which is desired in view of the position of the occupant to be protected such that an air bag of substantial depth is available to protect occupants such as larger stature persons who are seated further away from the location of cushion deployment, while a smaller air bag volume of diminished depth is available to protect occupants such as smaller stature persons seated closer to the location of cushion deployment. The deployed profile may also be adjusted based upon the severity of the crash event giving rise to the deployment.

The present invention further provides an effective mechanical actuation mechanism to adjust the deployment characteristics of the air bag cushion which actuation mechanism is not dependent upon a particular cushion construction technique and is activated based upon measured parameters of the crash event and the occupants to be protected.

Furthermore, the actuation mechanism to control the deployed profile of the air bag cushion may be operated either independently or in conjunction with a device to adjust the level of inflator gas which enters the air bag cushion thereby providing additional versatility of operation. Conjunctive operation may be carried out utilizing a single common initiator such as a pyrotechnic squib. Thus, it is a potentially preferred feature of the present invention that the air bag assembly may incorporate as few as two initiators (i.e. one initiator to activate the inflator and one initiator to initiate the actuation mechanism to control the deployment profile of the air bag and the level of inflation gas which enters the air bag).

In addition, the actuation mechanism to control the deployed profile and level of inflation gas may be mounted externally on the inflator or the supporting housing thereby avoiding any need to substantially modify the shape or construction of the inflator housing.

In addition, the actuation mechanism and variable profile air bag of the present invention may be used in conjunction with traditional single stage inflators without requiring internal modifications to such inflators.

These advantages are accomplished in a potentially preferred form of the present invention by providing an inflatable air bag expandable to a first volume and depth which first volume and depth may be restrained to a second diminished volume and depth by tethers which are attached at locations across the surface of the air bag cushion and which are releasably attached to a releasable anchor assembly independent from the air bag cushion. Based upon the severity of the crash event and/or the size and/or the position of the occupant to be protected, an actuation mechanism which releases the tethers from the anchor assembly may be either activated or may remain deactivated to yield a deployed air bag cushion of desired volume and geometric configuration. The volume of inflation gas entering the air bag cushion may be adjusted simultaneously with the profile of the air bag cushion.

According to the potentially preferred form of the invention, the actuation mechanism will remain deactivated in the event that the crash event is of low severity and/or the occupant to be protected is of small stature and/or the occupant to be protected is seated in a position close to the location of air bag deployment, thereby resulting in a constrained final expanded geometry. In the event that the crash event is of sufficient severity and/or the occupant to be protected is of larger stature and/or the occupant to be protected is seated further away from the location of air bag deployment, the actuation mechanism may be activated to at least partially eliminate depth restraint thereby permitting the air bag to expand to a greater volume and depth so as to provide additional cushioning for such an occupant.

Thus, it will be appreciated that variable expanded geometries may be achieved in the inflated air bag with such geometries being controllable and adjustable based upon the severity of the crash event and/or the physical parameters of the occupant to be protected. Such control is preferably achieved through use of one or more mechanical actuation mechanisms which are either activated or deactivated to effect control of the inflatable air bags by either holding or releasing tethering restraint elements from an anchoring location remote from the air bag cushion.

Since the activation or deactivation of the actuation mechanism is carried out in conjunction with deployment of the air bag cushion, the necessary geometric character may be achieved for a given occupant as may be present within the vehicle at the time of deployment. Thus, the variable air bag and actuation mechanism according to the present invention offers substantial versatility in the protection of large numbers of diverse occupants including very small and very large occupants experiencing different levels of crash severity. It will also be appreciated that this system provides a simple, cost effective and highly reproducible system for controlling the volume of deployed air bag cushions even when using a traditional single stage inflator.

BRIEF DESCRIPTION OF THE DRAWINGS

The present invention will now be described by way of example only, with reference to the accompanying drawings which constitute a part of the specification herein and in which.

While the invention has been illustrated and generally described above and will hereinafter be described in connection with certain potentially preferred embodiments, it is to be understood that in no event is the invention to be limited to such illustrated and described embodiments. On the contrary, it is intended that the present invention shall extend to all alternatives and modifications as may embrace the principles of this invention within the true spirit and scope thereof.

DESCRIPTION OF THE PREFERRED EMBODIMENTS

Figure 1:
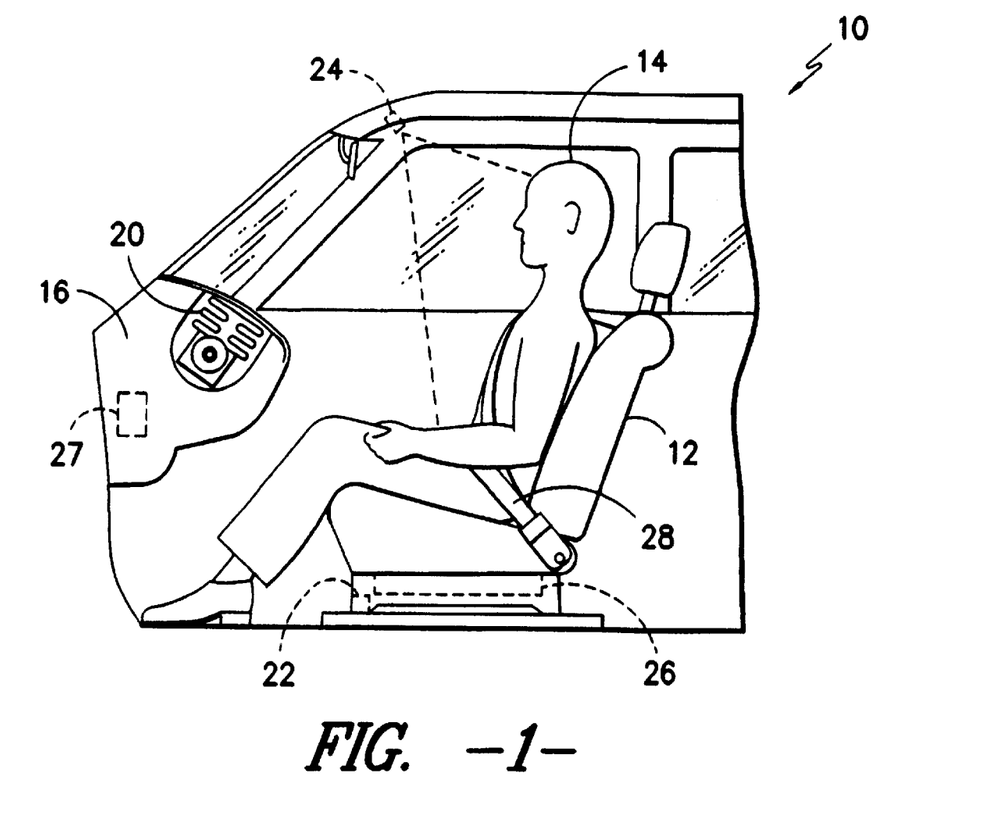
FIG. 1 is a cut-away view of a vehicle interior showing an air bag cushion in a stored undeployed state in opposing relation to a vehicle occupant.

Turning now to the drawings, wherein to the extent possible like reference numerals are utilized to designate like components throughout the various views, in FIG. 1 it is seen that a vehicle 10 may include a seating structure 12 which supports an occupant 14 in generally opposing relation to an instrument panel 16. An inflatable air bag 20 may be housed within the instrument panel 16 for outward deployment towards the occupant 14 in the event of a collision.

While the air bag 20 is illustrated for descriptive purposes in relation to a vehicle passenger, it is to be understood that the present invention is in no way intended to be limited to a passenger side configuration. On the contrary, it is contemplated that the present invention may have equal applicability to air bag deployment in opposing relation to the operator (not shown) of the vehicle from the steering column (not shown) as well as in relation to air bags deployed from other regions within the vehicle interior including, by way of example only, side-impact air bags and inflatable curtain structures.

It is contemplated that the vehicle interior will preferably include a seat position sensor 22 as the primary means of detecting the position of the occupant 14 relative to the instrument panel 16. It is further contemplated that the vehicle 10 may include additional position sensors such as an optical scanner 24 or the like to measure both the volume and position of the occupant to be protected. It is contemplated that the interior of the vehicle 10 may also be provided with a scale 26 disposed within the seating structure 12 so as to provide additional data regarding the load to which the inflatable air bag 20 may be subjected. The seating structure 12 may also be provided with sensing elements to measure the degree to which the seating structure 12 is reclined. The vehicle 10 may also be provided with sensors to determine and communicate whether or not the occupant is utilizing the recommended seat belt structures 28. A deceleration meter 27 as will be well known to those of skill in the art may be utilized to determine the relative severity of any crash event which may give rise to deployment of the inflatable air bag 20. The data collected may be utilized to determine desirable expanded profile characteristics for the air bag 20 according to the present invention.

It is believed that in some instances persons of small stature may benefit if the air bag 20 according to the present invention is of a reduced profile upon deployment due to the fact that such occupants have a lower body mass and are generally seated in closer proximity to the instrument panel 16. Such a reduced profile may also be desirable in crash events of relatively low severity. Conversely, it is believed that in some instances occupants of larger stature may benefit from a deeper profile air bag 20 due to their enhanced mass and propensity to be positioned further from the location of air bag deployment. An enhanced profile air bag may also be beneficial in some very severe crash events. In the event that a person of smaller stature is seated at a remote distance from the location of air bag discharge, it may be desirable for the air bag 20 to assume an extended profile so as to span the distance between the occupant and the location of discharge. Likewise, a person of larger stature who is seated in unusually close proximity to the location of air bag discharge may benefit from a shallow inflated profile.

The determination of the potentially desirable profile character of the air bag 20 for various occupants seated in various positions may be determined based upon event simulations utilizing so-called "crash dummies" of various sizes in various positions experiencing different crash severities within the vehicle 10. Such size, position and crash severity parameters may be stored along with corresponding desired gas emission characteristics within an electronically accessible storage registry for access by a processing unit such as an on-board computer during a collision event. During such an event, the relative severity of the collision may be measured by the deceleration meter 27 while the position of the occupant 14 as measured by the seat position sensor 22 as well as data from any other sensors as may be utilized will be correlated to corresponding values as archived within the storage registry thereby providing data on the desired profile characteristics of the air bag 20 for the occupant 14 based upon the severity of the collision event and upon his or her orientation within the interior of the vehicle 10 at the time the event takes place.

According to the potentially preferred form of the invention, the air bag 20 will have a first expanded profile and at least a second expanded profile which is characterized by less depth and lower volume than the first expanded profile. Such diminished profile and volumetric capacity is preferably achieved through the use of tethered restraints 30 as illustrated in FIGS. 2, 3, 4A and 4B. The degree of restraint applied by the tethered restraints 30 is relaxed either completely or to some secondary level when such tethered restraints 30 are released from an anchoring point at a position remote from the air bag 20 in the manner to be described further hereinafter.

The release or retention of the tethered restraints 30 is preferably carried out at the time of inflation of the air bag 20 based upon the preferred profile character of the air bag 20 in view of the measured collision severity and/or physical character and/or position of the occupant 14. That is, if the collision severity, physical character and orientation of the occupant 14 are such that previously collected data indicates that a deep profile and corresponding larger volume are desired for the inflatable air bag 20, then the tethered restraints 30 are released from their anchored position at the time of inflation thereby permitting the inflatable air bag 20 to assume an expanded enhanced profile. Conversely, in the event that the collision severity, physical character and orientation of the occupant 14 are such that the inflatable air bag 20 is preferably of a more shallow profile and lower volume, then the tethered restraints 30 will remain anchored during deployment of the inflatable air bag 20 so as to restrain the final profile thereof.

Figure 2:
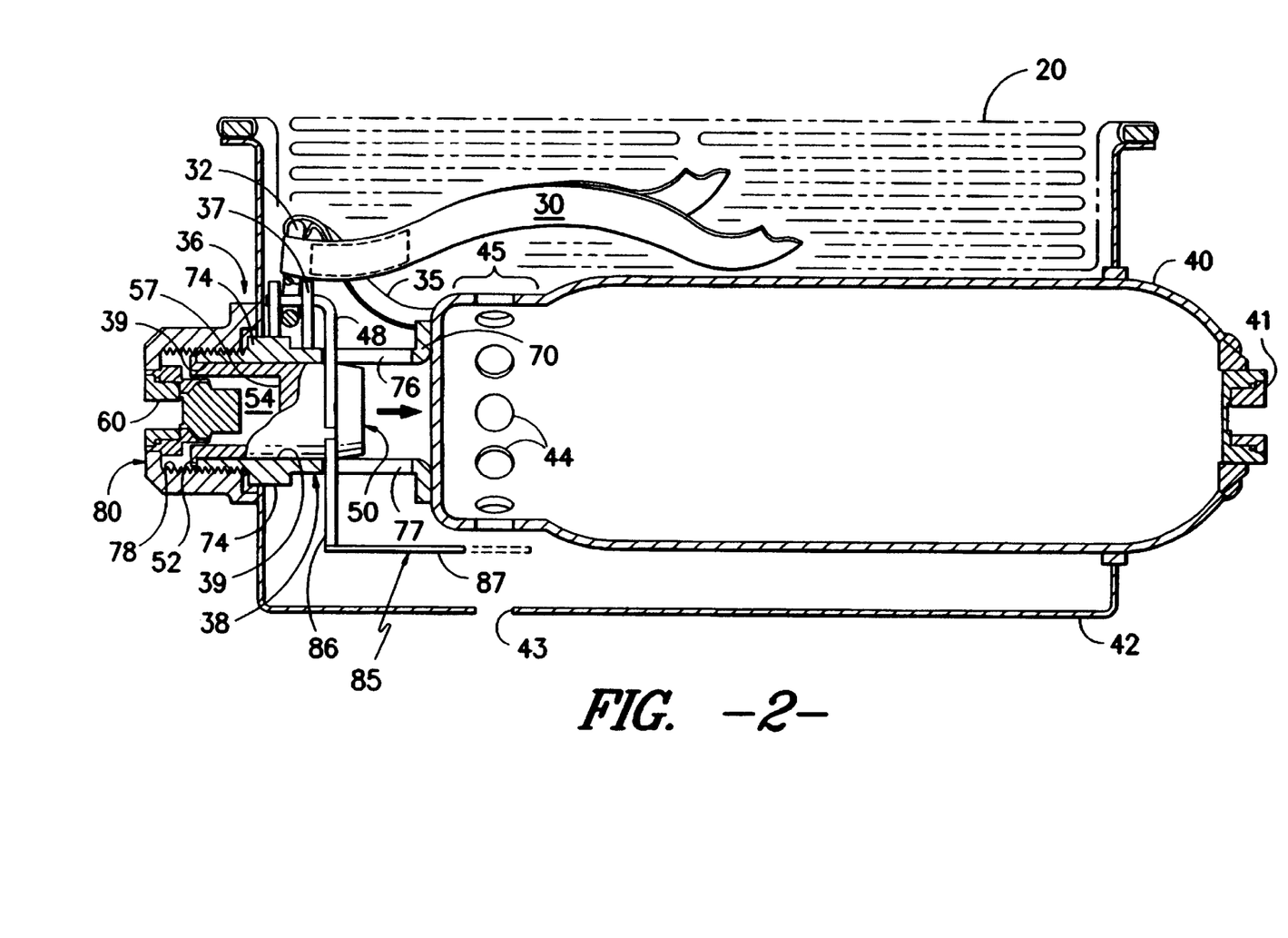
FIG. 2 is a cut-away view of an air bag module including an inflator and a first embodiment of an actuation mechanism for controlling the expansion of a variable profile air bag as well as controlling the quantity of inflator gas which enters the variable profile air bag.
Figure 3:
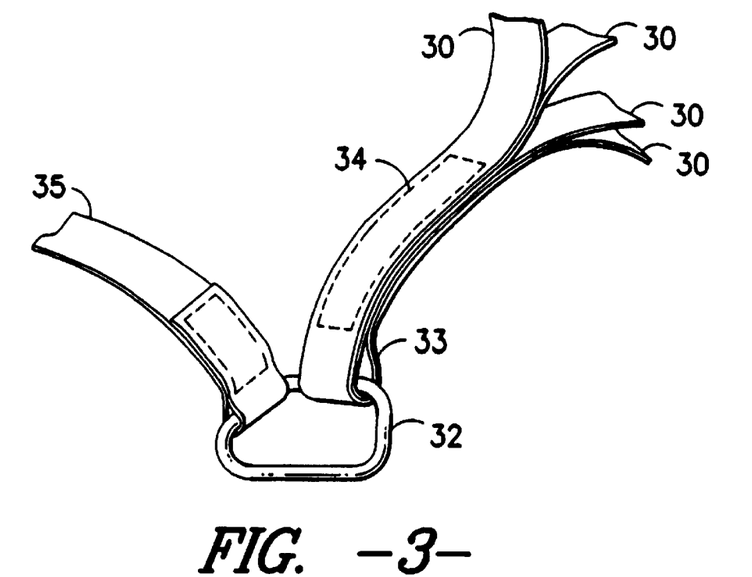
FIG. 3 is a detailed view of an anchoring connection as may be used to hold profile constraining tethering elements in place at an anchoring location.

Looking to FIGS. 2 and 3, the tethered restraints 30 may be formed into a loop 33 which is optionally held within a ring element 32. As shown, in the event that a ring element is utilized, the attachment between the ring element 32 and the tethered restraints 30 may be attained by passing the various tethered restraints 30 collectively through the opening at the interior of the ring element 32 so as to form the loop 33 which can slide along the length of the ring element 32. The configuration of the loop 33 is thereafter maintained by attaching the tethered restraints 30 to one another along a length remote from the loop 33. The joiner between the tethered restraints 30 may be formed by any suitable joining technique as may be known to those of skill in the art including, by way of example only, the application of a sewn seam 34 as may be applied using industrial sewing equipment. Other modes of attachment may include adhesive bonding, ultrasonic welding, RF welding, and combinations thereof.

The material forming the tethered restraints 30 is preferably a material of pliable nature such as a woven or knitted textile of construction resistant to substantial elongation upon the application of tensile forces. A woven structure of nylon yarns may be preferred.

As shown, a mooring strap 35 is also preferably looped in fixed relation around the ring element 32. The distal end of the anchoring strap is preferably attached in fixed relation to a secure point of attachment either on the air bag 20 or external thereto thereby acting as a mooring line for the ring element 32 and attached tethered restraints 30 during deployment of the air bag 20. However, it is also contemplated that the mooring strap 35 may be eliminated if desired.

In the event that a ring element 32 is utilized, it is preferably formed from a smooth surface material of high strength such as metal or the like. Such materials have the ability to withstand substantial loading without undergoing plastic deformation. As will be discussed further hereinafter, the ring element 32 may accept a moveable retaining member in sliding relation through its opening such that the withdrawal of the retaining member releases the ring element 32 and tethered restraints 30 attached thereto. In the event that a ring element 32 is not utilized, it is contemplated that this function may be carried out by the loop 33 which may likewise accept a retaining member therein. Thus, it is to be appreciated that the use of the ring element 32 is in no way considered to be critical to the performance of the present invention.

As best seen in FIG. 2, according to one embodiment of the present invention, the ring element 32 is operatively connected to an actuation mechanism 36 via a bracket assembly and scraping element 37. In particular, the ring element 32 is seated between upstanding walls of the bracket assembly 37. In turn, the bracket assembly 37 may be welded or otherwise attached to a support structure 38 connected to a gas emitting inflator 40 which is activated by an initiator 41 such as a pyrotechnic squib or other suitable device as will be well known to those of skill in the art.

The gas emitting inflator 40 is stored within a housing 42 which may include one or more vent openings 43 for transmission of inflator gas outwardly from the module away from the air bag 20. As illustrated, such vent openings are normally in fluid communication with gas discharge ports 44 generally surrounding the diffuser portion 45 of the inflator 40. As will be appreciated, while the support structure 38 of the actuation mechanism 36 is illustrated as being connected to the gas emitting inflator 40, it is likewise contemplated that any number of other arrangements may also be utilized. By way of example only, it is contemplated that the actuation mechanism 36 may be located remote from the inflator 40 and attached directly to the housing 42.

According to the illustrated embodiment, one leg of a substantially right angled pin element 48 may be passed through appropriately sized apertures (not shown) within the walls of the bracket assembly as well as through the open center of the ring element 32. As will be appreciated, in such an arrangement the ring element 32 will be anchored in place within the bracket assembly 37 thereby preventing the withdrawal of the ring element 32 due to the obstruction created by the pin element 48. The tethered restraints 30 which are fixedly attached to the ring element 32 will likewise be anchored to the bracket assembly 37. The reach of the tethered restraints 30 is thereby limited to the distance between the bracket assembly and the distal ends of the tethered restraints 30. Accordingly, when such distal ends of the tethered restraints 30 are fixedly attached to portions of the air bag 20, the expanded profile of the air bag 20 is limited due to the anchored relation between the ring element 32 and the pin element 48.

As illustrated, the leg of the pin element 48 which does not extend through the bracket assembly 37 preferably extends into a plunger element 50 which is held within the interior of the support structure 38 at the end of the inflator 40. The support structure 38 preferably has a substantially hollow tubular shape including interior walls 39 defining an axial opening into which the plunger element 50 and an initiator device 60 such as a pyrotechnic squib may be inserted during assembly.

The support structure 38 preferably includes a first support end 70 of a substantially flanged configuration that is secured directly to the head portion of the inflator 40. The first support end 70 may be secured to the inflator 40 by any suitable method, such as welding. The support structure 38 also preferably includes a spacing shoulder 74 which is sized larger than an end opening in the housing 42 such that the support structure 38 is limited from going through the end opening within the housing 42 and is properly positioned during assembly. The spacing shoulder 74 is preferably integrally formed with the support structure 38 such as by machining or molding but may also be provided as a separate piece attached to or slipped over the support structure 38. In the installed condition, the spacing shoulder 74 preferably abuts an end wall of the housing 42.

According to the illustrated embodiment, the support structure 38 is externally attached to the inflator 40 and may be provided as an assembly with the inflator 40 or may alternatively be integrally formed with the inflator 40. The support structure 38 preferably includes a first guide channel 76 which extends longitudinally along at least a portion of the distance between the spacing shoulder 74 and the first support end 70 of the support structure 38 such that the downwardly extending leg of the pin element 48 which does not engage the ring element 32 or loop 33 passes through the first guide channel 76 and into the plunger element 50 as shown. The support structure 38 further preferably includes a threaded end portion 78 which extends past the spacing shoulder 74 through the end opening of the housing 42 for mating with a cap nut 80 to secure the inflator 40 and the variable volume actuation mechanism 36 to the housing 42.

The plunger element 50 is preferably integrally formed from a plastic material and has a generally cylindrical shape. The plunger element 50 is preferably seated within the interior walls 39 of the support structure 38 and has a diameter which is slightly smaller than the axial opening between the interior walls 39 such that the plunger 50 is slidable relative to the interior walls 39. The plunger 50 includes at least a first radial plunger hole which is sized for the close receipt of the downwardly extending leg of the pin element 48. The plunger element 50 may also include a second radial plunger hole for the close receipt of a moveable vent blocking device 85 the operation of which will be described further hereinafter. However, it is also contemplated that the variable profile actuation mechanism 36 or such other mechanism as may be used to regulate the expanded configuration of the air bag 20 may be operated without such a moveable vent blocking element 85 if desired. The elements received within the linear plunger element 50 may be secured in place by snap-fitted attachment, although it will be appreciated that other methods of attachment including by way of example only crimping, fastening, or adhesion may also be utilized to obtain secure attachment.

As shown, the plunger element 50 preferably includes a shear feature 52 which is illustrated as a flange located at the end of the plunger element 50. The shear feature 52 is preferably integrally formed with the plunger element 50, but may also be a separate piece attached to the plunger element 50. The shear feature 52 is sized larger than the axial opening within the support structure 38 such that the sheer feature 52 engages the support structure 38 during insertion to limit the insertion of the plunger element 50 into the support structure 38.

The plunger element 50 preferably includes an axial plunger bore 54 in which an initiator device 60 such as a pyrotechnic squib, pneumatic actuator or the like is seated prior to activation. The initiator device 60 preferably is activated upon the receipt of a signal from a control device such as an on-board computer (not shown) based upon inputs from the seat position sensor 22, optical scanner 24, deceleration meter 27 and any other sensor as may be used to measure the condition of the occupant including the forces to which the occupant is being subjected during the event. Upon activation, the initiator device 60 produces a pressure wave that presses against a plunger reaction surface 57. The application of such force causes the shear feature 52 to break off and permits the plunger element 50 to slide within the support structure 38 until engaging the head 49 of the inflator 40 which acts as a stop surface.

In the event that a vent blocking element 85 is to be utilized in conjunction with the variable profile actuation mechanism 36, the vent blocking element 85 will preferably include an upwardly projecting arm portion 86 which may be snap fittedly attached in the plunger element 50. The vent blocking 85 will also preferably include a slide portion 87 extending at generally a right angle to the arm portion 86. Thus, in illustrated embodiment wherein the vent blocking element 85 is to be utilized, the pin element 48 and the vent blocking element 85 are arranged in a substantially "Z" shaped profile.

The slide portion 87 preferably has a generally curved shape such that allows the insertion into the housing 42 through round end wall openings during the assembly process. The vent blocking element 85 is preferably moveable within a second guide channel 77 within the support structure 38 so as to close an inflator vent opening 43 upon activation of the initiator device 60. In FIG. 2, the slide portion 87 is shown in a first position in solid lines in which the inflator vent opening 43 is open thereby lowering the amount of gas available for inflation of the air bag 20 and is illustrated in phantom lines in a second position in which the slide portion 87 is blocking the inflator vent opening 43 within the housing 42 thereby directing a larger quantity of available inflator gas into the air bag 20.

According to the illustrated embodiment, prior to activation of the inflator 40 by activation of the inflator initiator 41, the air bag 20 is stored in a folded condition atop the inflator 40. Also, prior to activation of the inflator 40, the pin element 48 as well as the optional blocking element 85 are held within the support structure 38 in a first position by the shear feature 52 such that the pin element 48 anchors the ring element 32 attached to the tethered restraints 30 in place within the bracket assembly 37. In addition, the slide portion 87 of the blocking element 85 is misaligned with the inflator vent opening 43 such that the inflator vent opening 43 is open thereby promoting the egress of inflator gas outwardly from the housing 42.

Upon sensing predetermined vehicle and occupant conditions, a signal is sent to the inflator initiator 41 thereby activating the inflator 40. Based upon the measurement of the collision severity and/or the position and/or physical character of the occupant 14, a signal is also sent to the initiator device 60 advising the initiator device 60 as to whether the first position is to be maintained or whether the initiator device 60 is to be activated at a predetermined time during activation of the inflator 40 to disengage the pin element 48 thereby releasing the tether elements from the bracket assembly 37. According to the potentially preferred arrangement, the initiator device 60 will be activated when conditions indicate that an air bag of deeper profile and larger volume is required and will remain in a deactivated state when conditions indicate that an air bag of more shallow profile and lower volume is desirable.

As previously indicated, upon activation, the initiator device 60 produces a pressure wave which presses against the reaction surface 57 of the plunger element 50 and quickly forces the plunger element 50 towards the head portion of the inflator 40. This movement carries the pin element 48 as well as any optional vent blocking element 85 within the plunger element 50 from the first position illustrated in FIG. 2 to a second position wherein the plunger element 50 is in contact with the head portion of the inflator 40. Such movement rapidly extracts the pin element 48 from the ring element 32 thereby releasing the tethered restrains 30 from their anchoring relation to the bracket assembly 37. Simultaneously, the vent blocking element 85 covers the vent opening 43 thereby increasing the quantity of inflation gas available to inflate the air bag cushion 20.

Figure 4A:
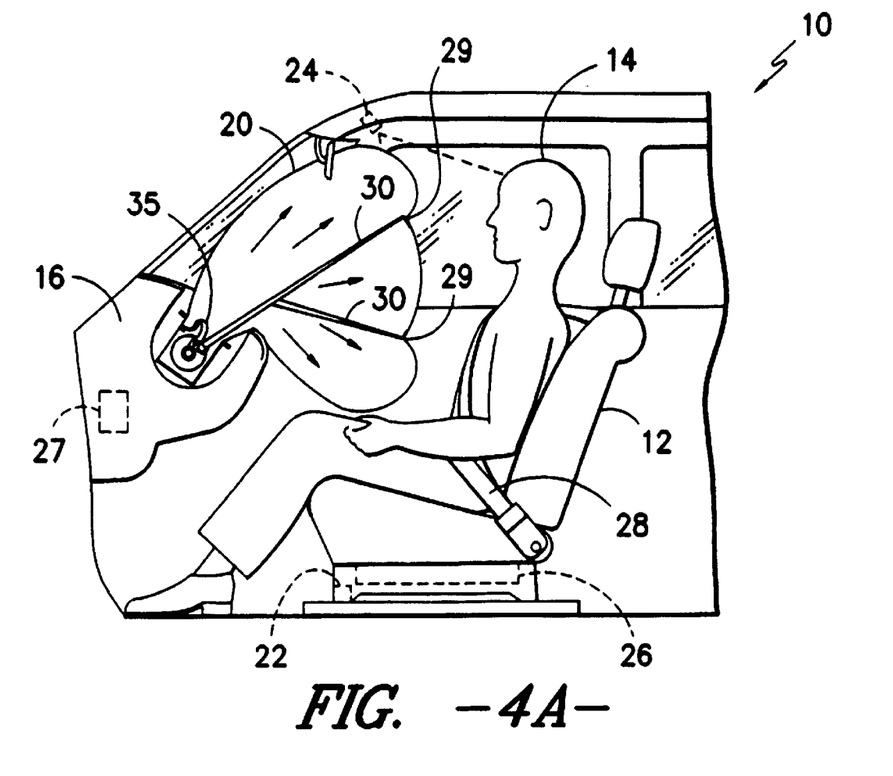
FIG. 4A is an illustrative profile view of a variable profile air bag according to the present invention in a deployed state in a reduced depth configuration.

From the foregoing discussion, it is to be appreciated that there are several basic permutations of expansion characteristics which may be achieved through use of the variable profile air bag 20 and corresponding actuation mechanism according to the present invention. Specifically, when the actuation mechanism remains in a deactivated position substantially as shown in solid lines in FIG. 2, the expansion of the air bag 20 will be limited in the depth dimension by the available length of the tethered restraints 30 between the anchoring pin element 48 and the points of connection 29 between the tethered restraints 30 and the surface of the inflatable air bag 20 as shown in FIG. 4A. As will be appreciated, in such a constrained configuration the cushion may inflate to an increased length and width as the available material expands in the dimensions which are not restricted.

Figure 4B:
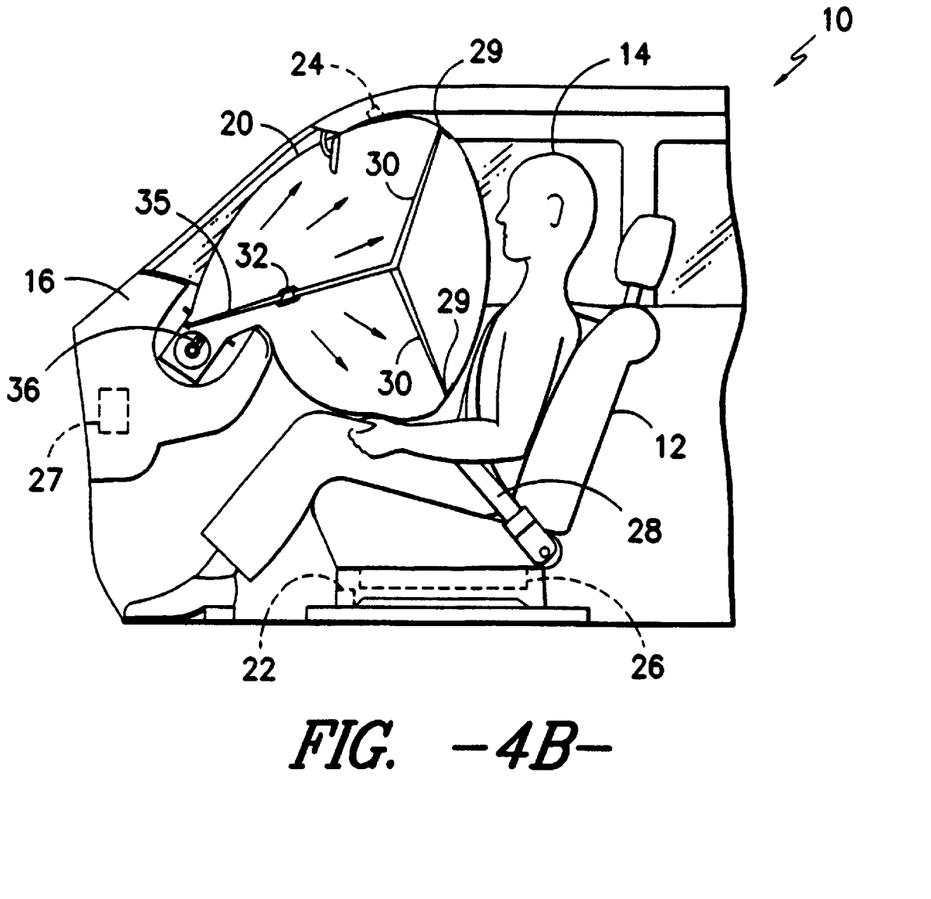
FIG. 4B is a view similar to FIG. 4A showing a variable profile air bag according to the present invention in a deployed state in an expanded configuration of enhanced depth.

In the event that the actuation mechanism 36 associated with the variable profile air bag 20 is activated, the pin element 48 releases the ring element 32 from its anchored location between the walls of the bracket assembly 37. Such release provides for the effective increase in the length of the tethered restraints 30 thereby permitting the air bag 20 to assume a substantially extended profile and increased volume as illustrated in FIG. 4B. In the illustrated embodiment, when the ring element 32 is released from the bracket assembly 37 the ring element 32 and tethered restraints 30 are nonetheless moored to a stable point of connection on the housing 42 by the mooring strap 35. It has been found that maintaining such a stable connective relationship may be used to provide a continued degree of control over the final expanded profile of the air bag 20. More particularly, it has been found that by maintaining some degree of tethering the available increased volume of the air bag 20 may be used to selectively increase the depth dimension of the final expanded profile far more than would naturally occur if tethering restraint is eliminated entirely. Thus, a generally deep elongated profile as shown may be obtained without requiring a substantial increase in volumetric capacity. By way of example only and not limitation, it is contemplated that the actual final volumetric increase in the air bag cushion 20 will be in the range of about 25% or less and may be in the range of about 15% or less.

While the use of the anchoring strap 35 may be desirable for some applications, it is likewise contemplated that the anchoring strap 35 may be eliminated if desired. In such an arrangement, a broader more rounded expanded profile may be obtained.

As will be appreciated, the incorporation of the vent blocking element 85 for operation in conjunction with the variable volume actuation mechanism 36 permits the discharge of an enhanced quantity of inflator gas into the air bag 20 in the larger expanded condition of FIG. 4B without the need for any additional initiating device. It is to be appreciated that while only a single actuation mechanism has been illustrated and described in relation to both the expanded profile of the air bag 20 and the activation of the vent blocking element 85, it is likewise contemplated that separate actuation mechanisms may be utilized to adjust the profile of the air bag 20 and to actuate any vent blocking element 85 or other inflator gas control as may be utilized. It is further contemplated that more than one actuation device may be utilized to provide a range of different profile characteristics to the inflatable air bag 20.

It will be understood that a person skilled in the art may make modifications to the embodiment as described above. Turning now to FIGS. 5–8 an alternative embodiment of the present invention is provided wherein like elements to those previously described are designated by like reference numerals with a prime. As best illustrated through reference to FIGS. 5–7, in this embodiment the slide portion 87' of the vent blocking element 85' is disposed in a cupping relationship in the region generally below the inflator 40'. The slide portion 87' preferably includes one or more apertures 89' which are disposed so as to move into and out of covering relation to vent openings 43' within the housing 42'. The apertures 89' serve to adjust the effective venting area available for transferring inflation gas away from the air bag 20' as the air bag undergoes loading. As illustrated, upon linear movement of the slide portion 87' the apertures 89' may be moved relative to the vent openings 43' so as to either increase or decrease the effective area of the vent openings 43' so as to control the venting characteristics of the air bag 20'.

Figure 6:
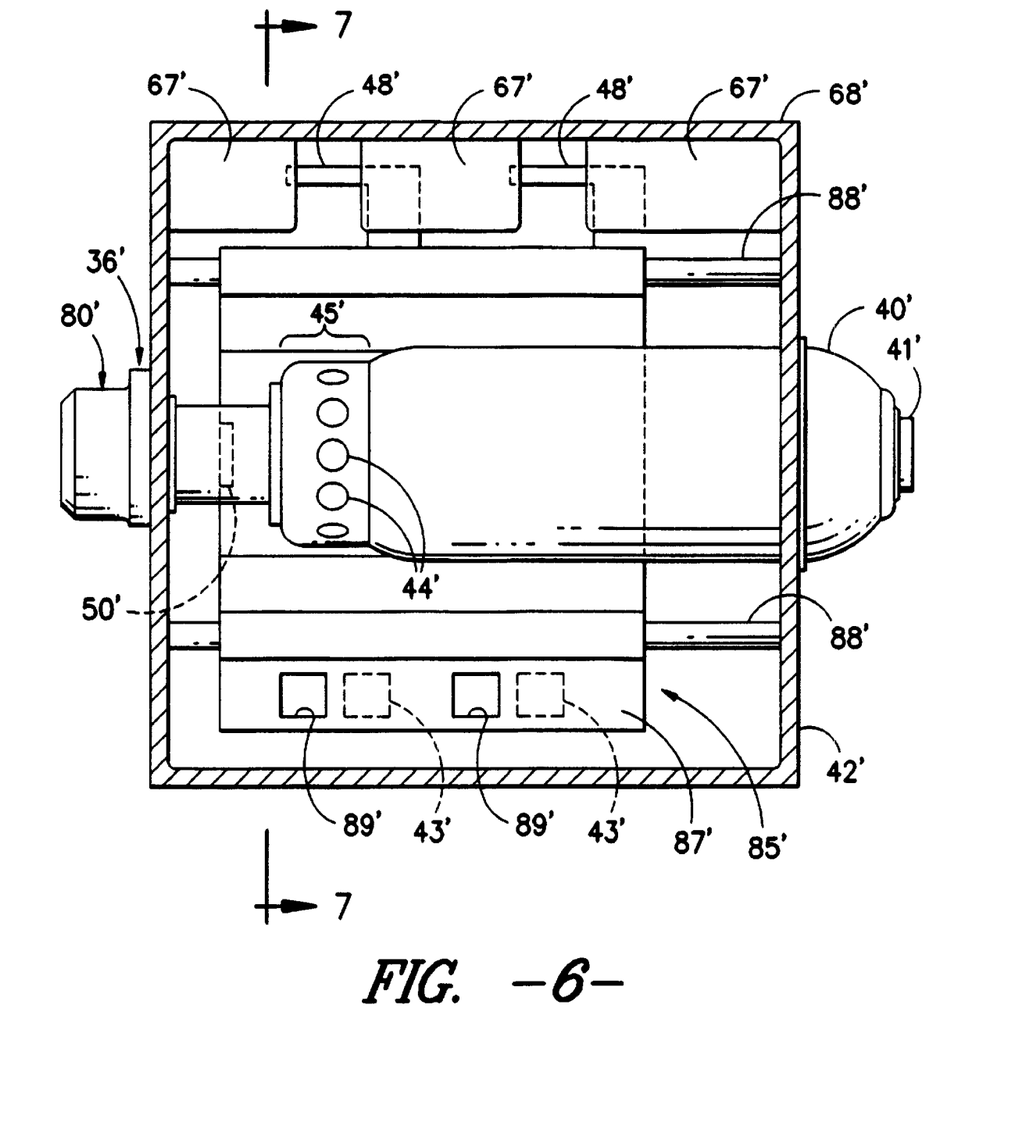
FIG. 6 is a view taken along line 6—6 in FIG. 5.
Figure 7:
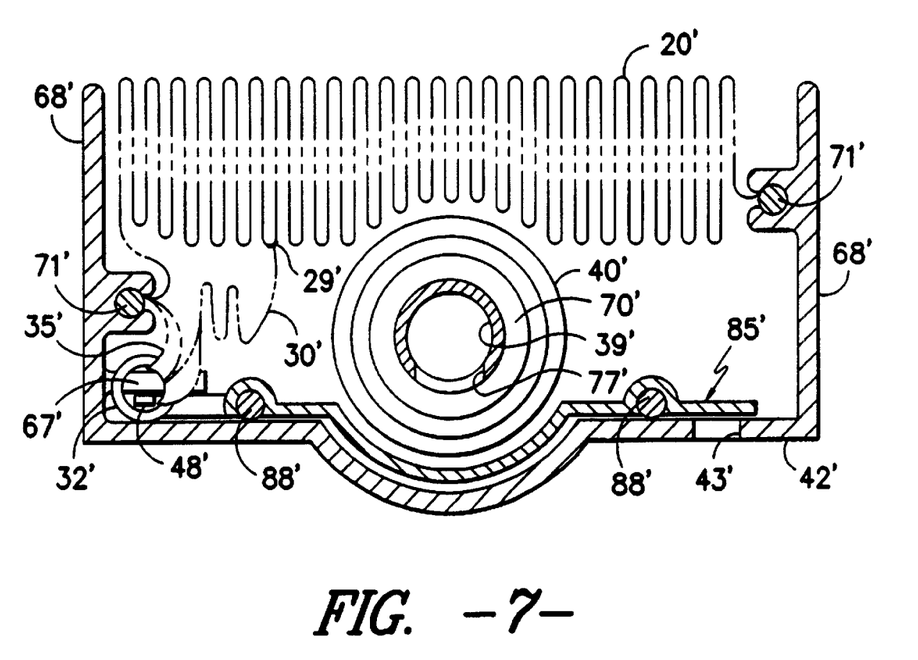
FIG. 7 is a view taken along line 7—7 in FIG. 6 prior to deployment.

As best seen in FIGS. 6 and 7, also carried on the slide portion 87' of the vent blocking element 85' are one or more rod-like tether attachment retaining elements 48' which are carried within a segmented sleeve 67' extending along a side wall 68' of the housing 42' in the region generally adjacent to the length of the inflator 40'. As will be appreciated, the breaks in the segmented sleeve 67' permits the insertion of the rod-like tether attachment retaining elements 48' through either a ring element 32' (FIG. 7) or a loop at the end of tethered restraints 30'. According to a potentially preferred practice, the other end of such tethered restraints will preferably be securely attached to the surface of the air bag cushion 20' at a seam between the main panel and the side panels of the air bag cushion 20' so as to provide substantially even load distribution to the panels of the air bag cushion 20'.

Figure 5:
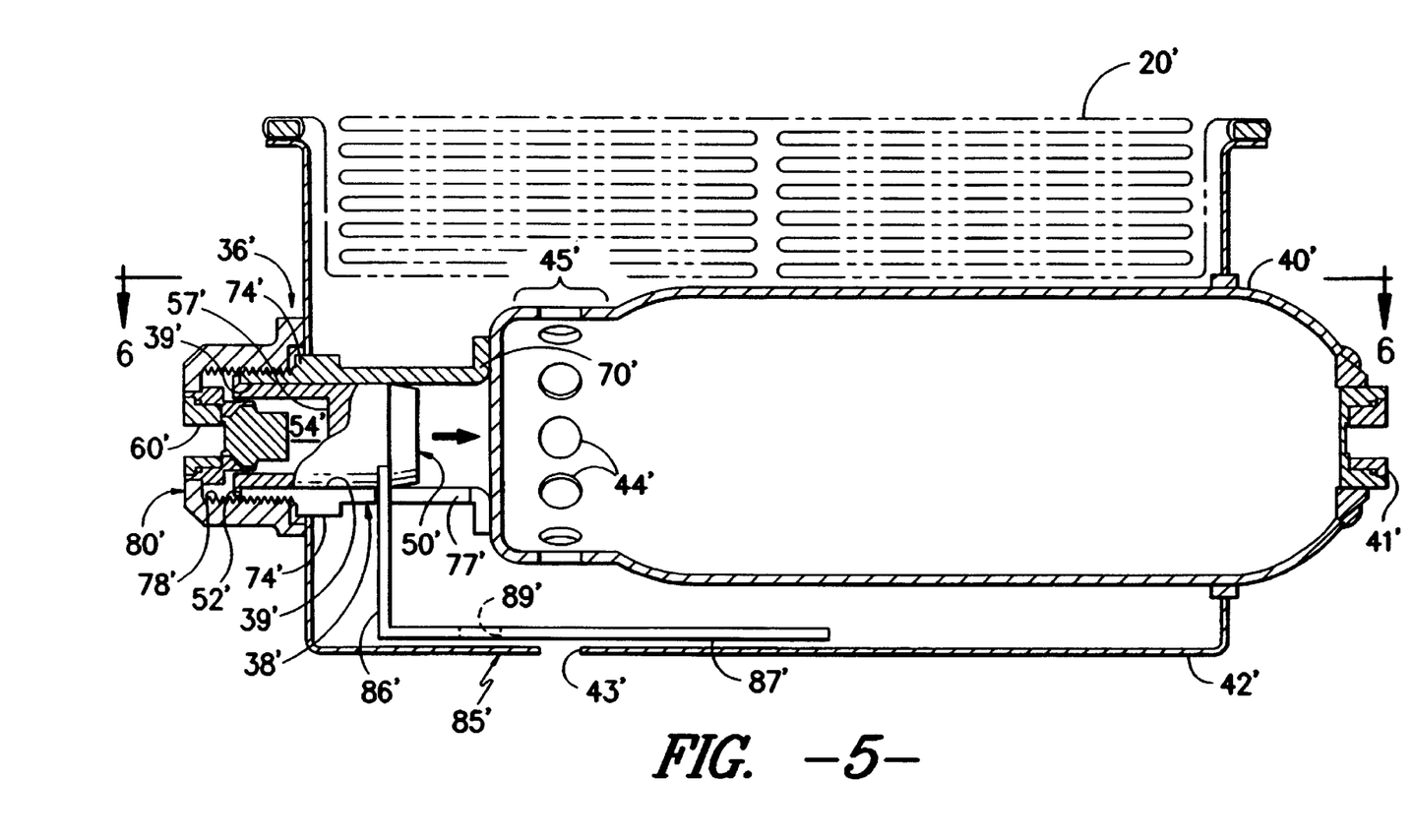
FIG. 5 is a view similar to FIG. 2 illustrating an alternative configuration of an actuation mechanism for controlling the expansion of a variable profile air bag as well as controlling the quantity of inflator gas which enters the variable profile air bag.
Figure 8:
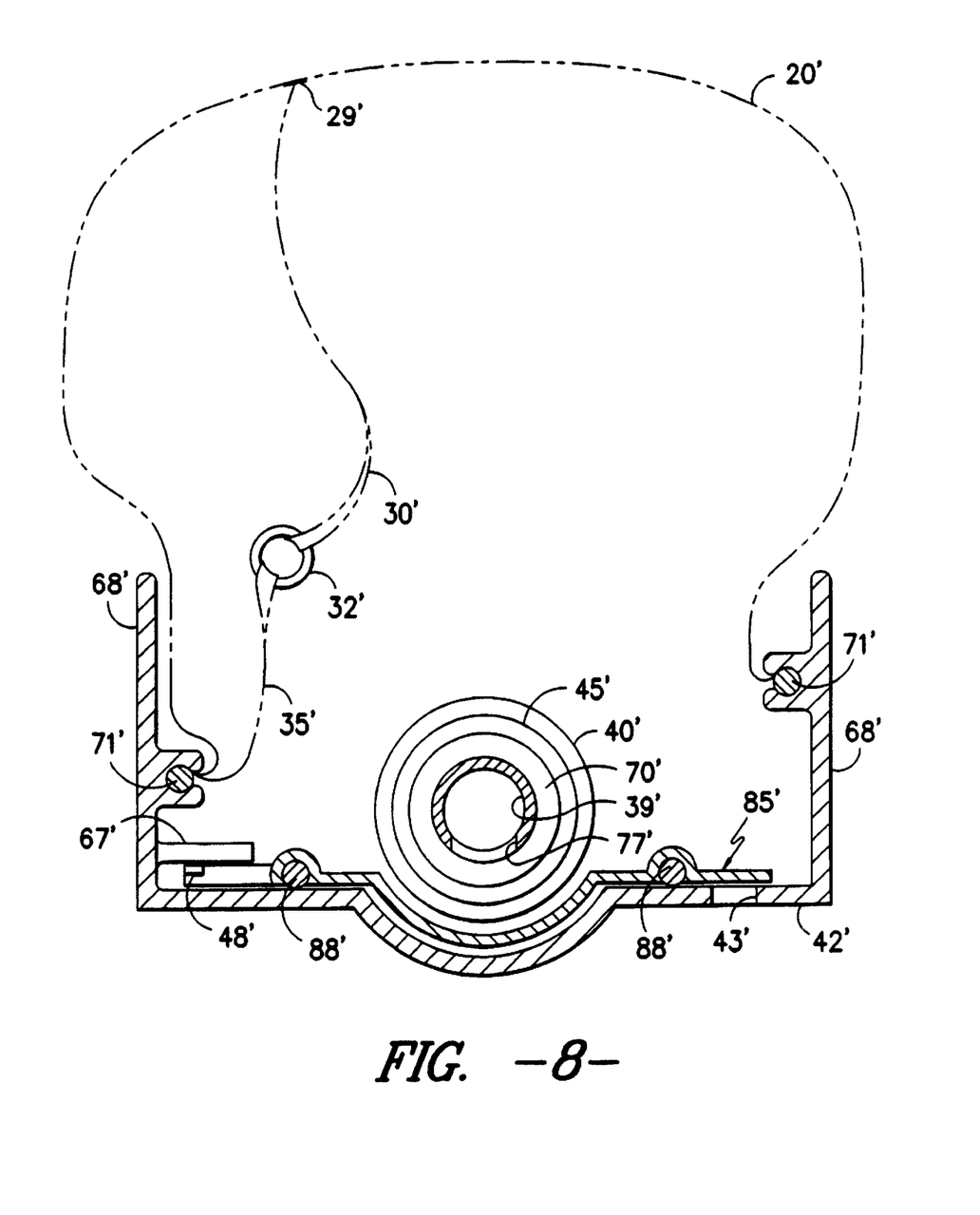
FIG. 8 is a view similar to FIG. 7, wherein tethering elements have been released from a shortened anchored position upon deployment of an air bag cushion.

As best illustrated through simultaneous reference to FIGS. 5, 7 and 8, in the event that an extended profile bag deployment is desired, a signal is sent via an onboard computer or other appropriate device to an initiator 60' so as to move the plunger element 50' and thereby also move the vent blocking element 85' including the slide portion 87' and the rod-like tether attachment retaining elements 48' in a substantially linear manner along track elements 88' extending substantially parallel to the length of the inflator 40'. Such linear movement thereby causes the tether attachment retaining elements 48' to slip out of engagement with the tethered restraints 30'. This release frees the tethered restraints to extend to their full operative length as the air bag cushion 20' is inflated. As shown, a mooring strap 35' preferably continues to attach the tethered restraints 30' to the housing 42' via a retaining rod insert assembly 71' which also serves to hold the air bag cushion 20' in place in a manner as is well known to those of skill in the art. Such retention provides a continued degree of control over the final expanded profile of the air bag cushion 20' even with the deep profile deployment.

It is contemplated that the use of the variable profile air bag according to the present invention will permit a single cushion to be utilized to effectively protect a wide range of occupants by having the air bag conform to the requirements of such occupants. In particular, it is contemplated that it will be possible to avoid substantial divergence between the forces to which occupants of different physical dimensions may be subjected during interaction with the air bag.

While measurements relating to the position and/or size of the occupant to be protected may be used to determine whether or not to release the profile restraining tether elements it is likewise contemplated that other factors may also be utilized. By way of example only, it is contemplated that the velocity of the vehicle 10 may be used as an overriding factor in the determination as to whether or not an enhanced profile is desired. In particular, it is contemplated that minimum velocity thresholds may be preprogrammed into the on-board computer or other control device as may be utilized such that enhanced profile will not be obtained if the vehicle is traveling at a very low velocity.

It is to be understood that while the present invention has been illustrated and described in relation to potentially preferred embodiments, constructions, and procedures, that such embodiments, constructions, and procedures are illustrative only and that the present invention is in no event to be limited thereto. Rather, it is contemplated that modifications and variations embodying the principles of the present invention will no doubt occur to those of skill in the art. It is therefore contemplated and intended that the present invention shall extend to all such modifications and variations as may incorporate the broad aspects of the present invention within the full spirit and scope thereof.

What is claimed is:

1. An air bag assembly for cushioning restraint of an occupant in a vehicle during an impact event the air bag assembly comprising:

an inflator activatable to discharge inflation gas upon the occurrence of predetermined vehicle conditions;

an air bag cushion in fluid communication with the inflator such that upon discharge of inflation gas from the inflator the air bag cushion is inflated to a deployed state from a location of deployment in substantially opposing relation to the occupant;

a housing substantially surrounding the air bag cushion and the inflator prior to inflation of the air bag cushion, wherein the housing includes a venting area comprising at least one vent opening;

at least one profile restraining tether element extending from the air bag cushion to a releasable anchor structure so as to shorten the operative length of said at least one profile restraining tether element, the releasable anchor structure including a moveable retaining pin holding said at least one profile restraining tether element in place;

a moveable vent blocking member selectively moveable relative to said at least one vent opening; and an actuation mechanism comprising a force generating initiator activatable in response to a signal from a sensing device to selectively move the vent blocking member relative to said at least one vent opening, wherein the vent blocking member is operatively connected to the retaining pin such that upon movement of the vent blocking member the retaining pin is moved relative to said at least one profile restraining tether element thereby releasing said at least one profile restraining tether element from the releasable anchor structure in conjunction with selective adjustment of the venting area across the housing and wherein the air bag assembly further includes a scraping element contacting said at least one profile restraining tether element during movement of the retaining pin to disengage said at least one profile restraining tether element from the retaining pin.

2. The invention according to claim 1, wherein the vent blocking member comprises at least one opening selectively moveable relative to said at least one vent opening upon activation of the initiator.

3. The invention according to claim 1, wherein the vent blocking element comprises a member selectively moveable in blocking relation to said at least one vent opening upon activation of the initiator.

4. The invention according to claim 1, further comprising a mooring line extending between said at least one profile restraining tether element and a point of secure attachment remote from the retaining pin.

5. An air bag assembly for cushioning restraint of an occupant in a vehicle during an impact event, the air bag assembly comprising:
   an inflator activatable to discharge inflation gas upon the occurrence of predetermined vehicle conditions;
   an air bag cushion in fluid communication with the inflator such that upon discharge of inflation gas from the inflator the air bag cushion is inflated to a deployed state from a locution of deployment in substantially opposing relation to the occupant;
   a housing substantially surrounding the air bag cushion and the inflator prior to inflation of the air bag cushion, wherein the housing includes a venting area comprising at least one vent opening;
   at least one profile restraining tether element extending from the air bag cushion to a releasable anchor structure so as to shorten the operative length of said at least one profile restraining tether element, the releasable anchor structure including a moveable retaining pin holding said at least one profile restraining tether element in place;
   a moveable vent blocking member selectively moveable relative to said at least one vent opening; and
   an actuation mechanism comprising a single force generating initiator activatable in response to a signal from a sensing device to selectively move the vent blocking member relative to said at least one vent opening, wherein the vent blocking member is operatively connected to the retaining pin such that upon movement of the vent blocking member the retaining pin is moved relative to said at least one profile restraining tether element thereby releasing said at least one profile restraining tether element from the releasable anchor structure in conjunction with selective adjustment of the venting area across the housing and wherein the air bag assembly further includes a scraping element contacting said at least one profile restraining tether element during movement of the retaining pin to disengage said at least one profile restraining tether element from the retaining pin.

6. The invention according to claim 5, further comprising a mooring line extending between said at least one profile restraining tether element and a point of secure attachment remote from the retaining pin.

7. The invention according to claim 5, wherein the vent blocking member comprises at least one opening selectively moveable relative to said at least one vent opening upon activation of the initiator.

8. The invention according to claim 7, further comprising a mooring line extending between said at least one profile restraining tether element and a point of secure attachment remote from the retaining pin.

9. The invention according to claim 5, wherein the vent blocking member comprises a member selectively moveable in blocking relation to said at least one vent opening upon activation of the initiator.

10. The invention according to claim 9, further comprising a mooring line extending between said at least one profile restraining tether element and a point of secure attachment remote from the retaining pin.

* * * * *